(12) United States Patent
Wan et al.

(10) Patent No.: US 9,313,516 B2
(45) Date of Patent: Apr. 12, 2016

(54) METHOD FOR TRANSCODING VIDEO STREAMS WITH REDUCED NUMBER OF PREDICTIONS

(71) Applicant: ArcSoft Hangzhou Co., Ltd., Hangzhou, Zhejiang Province (CN)

(72) Inventors: JunQing Wan, Hangzhou (CN); Jin Huang, Hangzhou (CN); YaGuang Xie, Hangzhou (CN)

(73) Assignee: Hangzhou Danghong Technology Co., Ltd., Binjiang District, Hangzhou (CN)

( * ) Notice: Subject to any disclaimer, the term of this patent is extended or adjusted under 35 U.S.C. 154(b) by 324 days.

(21) Appl. No.: 13/942,690

(22) Filed: Jul. 15, 2013

(65) Prior Publication Data
US 2015/0016529 A1   Jan. 15, 2015

(51) Int. Cl.
  *H04N 7/12* (2006.01)
  *H04N 19/51* (2014.01)
  *H04N 19/30* (2014.01)
  *H04N 19/40* (2014.01)

(52) U.S. Cl.
  CPC ............... *H04N 19/51* (2014.11); *H04N 19/30* (2014.11); *H04N 19/40* (2014.11)

(58) Field of Classification Search
  CPC ........ H04N 19/51; H04N 19/40; H04N 19/30
  USPC .................................................... 375/240.16
  See application file for complete search history.

(56) References Cited

U.S. PATENT DOCUMENTS

| | | | |
|---|---|---|---|
| 2001/0055336 A1* | 12/2001 | Krause et al. ............ | 375/240.11 |
| 2009/0293093 A1* | 11/2009 | Igarashi ........................ | 725/115 |
| 2011/0225315 A1* | 9/2011 | Wexler et al. ................. | 709/231 |

OTHER PUBLICATIONS

Richardson, The H.264 Advanced Video Compression Standard, Second Edition (ISBN-13: 978-0470516928), Aug. 9, 2010.

* cited by examiner

*Primary Examiner* — Allen Wong
(74) *Attorney, Agent, or Firm* — Winston Hsu; Scott Margo

(57) ABSTRACT

A first request and a second request are received from a first client terminal and a second client terminal respectively. In response to the first request and second request, a first set of predictions is generated by predicting macroblocks of frames of a video stream. In response to the first request, a first set of quantized transform coefficients is generated by transforming the first set of predictions, and a first coded video stream is generated by coding the first set of quantized transform coefficients. In response to the second request, a second set of quantized transform coefficients is generated by transforming the first set of predictions, and a second coded video stream is generated by coding the second set of quantized transform coefficients. Finally, the first coded video stream is transmitted to the first client terminal, and the second coded video stream is transmitted to the second client terminal.

6 Claims, 4 Drawing Sheets

METHOD FOR TRANSCODING VIDEO STREAMS WITH REDUCED NUMBER OF PREDICTIONS

BACKGROUND OF THE INVENTION

1. Field of the Invention

The invention is related to a method for transcoding video streams, and more particularly to a method for transcoding video streams with reduced number of predictions.

2. Description of the Prior Art

Since the first version of H.264/AVC was published in 2003, the video coding industry has continued to evolve. The range of platforms and delivery mechanisms for video continues to grow, with an increasing expectation that video content should be available on any platform from mobile to HD and 3D displays, over any network including broadcast, internet, mobile, etc.

A single source video may be required to be transmitted to multiple clients or decoders, each with different capabilities. For example, a source video is coded three times to produce three independent AVC streams, each of which is transmitted and decoded to reconstruct the contents of the source video. A challenge for many video compression applications is to deliver multiple versions of a video sequence at different operational points, e.g. different qualities, spatial resolutions or frame rates. Since each version of the source video is coded independently, separately coding and transmitting each version is very time-consuming.

SUMMARY OF THE INVENTION

According to an exemplary embodiment of the claimed invention, a method for transcoding video streams by a server is disclosed. The method comprises receiving a first request from a first client terminal; receiving a second request from a second client terminal; predicting macroblocks of frames of a first video stream to generate a first set of predictions in response to the first request and the second request; transforming the first set of predictions into a first set of quantized transform coefficients in response to the first request; transforming the first set of predictions into a second set of quantized transform coefficients in response to the second request; coding the first set of quantized transform coefficients into a first coded video stream; coding the second set of quantized transform coefficients into a second coded video stream having a resolution identical to a resolution of the first coded video stream; and transmitting the first coded video stream from the server to the first client terminal, and transmitting the second coded video stream from the server to the second client terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
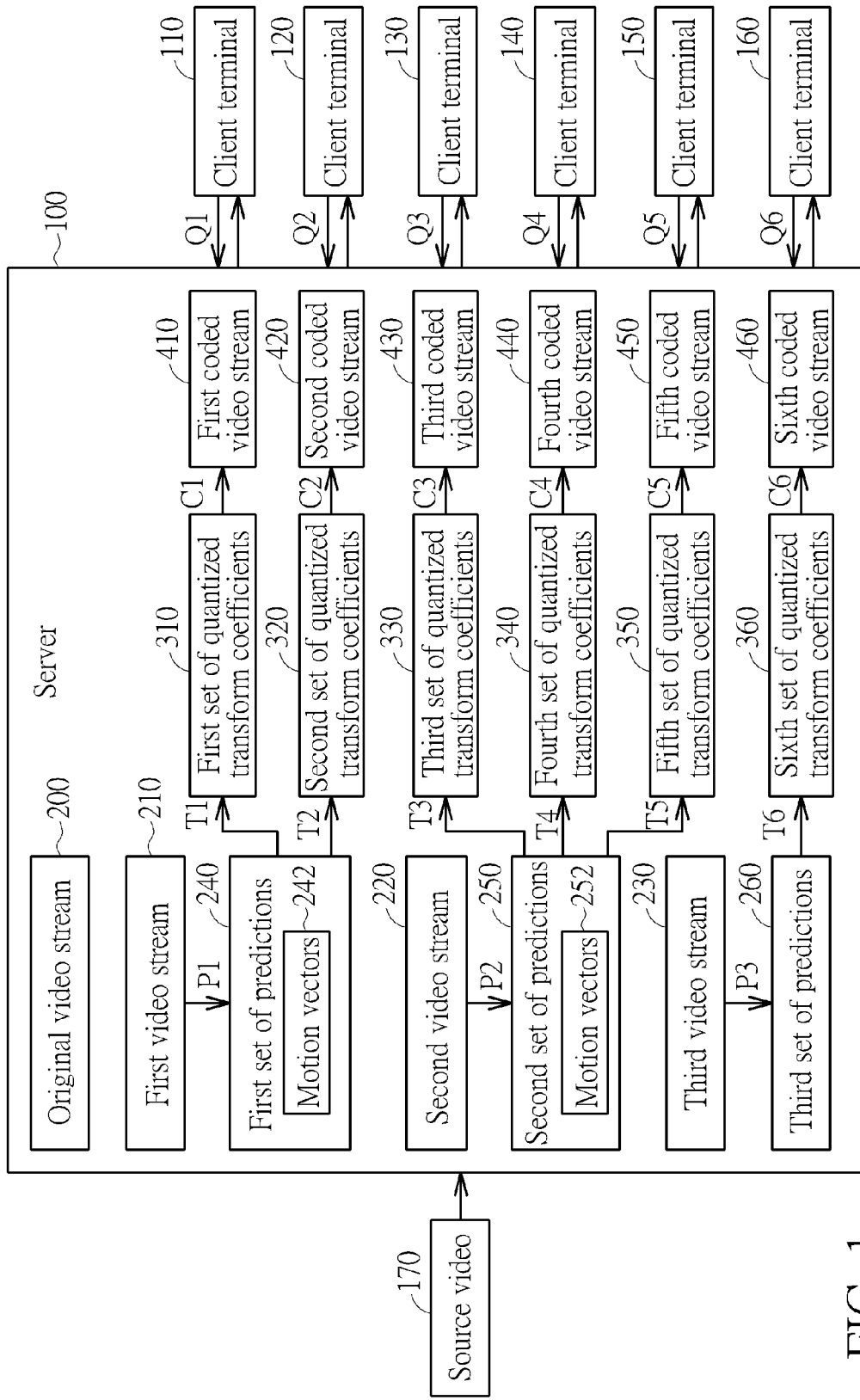
FIG. 1 illustrates a server generating and transmitting a plurality of video streams to corresponding client terminals in response to requests received from the client terminals.

Please refer to FIG. 1. FIG. 1 illustrates a server 100 generating and transmitting a plurality of coded video streams 410 to 460 to corresponding client terminals 110 to 160 in response to requests Q1 to Q6 received from the client terminals 110 to 160. The client terminals 110 to 160 are electronic apparatuses, such as cellular phones, personal computers, tablet computers, etc., that are capable of communicating with the server 100. Each of the requests Q1 to Q6 is configured to request video contents of a source video 170. The source video 170 may be a video program or a movie provided by a DVD player, a blue-ray player, a video camera, a file server or the likes capable of generating or providing the video contents. In response to the requests Q1 to Q6, the server 100 decodes the source video 170 into an original video stream 200 and encodes the original video stream 200 into various coded video streams 410 to 460. The coded video streams 410 to 460 may be represented with different formats. It should be noted that the server 100 only decodes the source video 170 once in response to the requests Q1 to Q6 that request multiple versions of the source video 170.

In response to the requests Q1 to Q6, the server 100 transmits the coded video stream 410 to 460 to the client terminals 110 to 160 respectively. In the embodiment, the first request Q1 and the second request Q2 are configured to ask the server 100 to provide the first coded video stream 410 and the second coded video stream 420 respectively. A resolution of the first coded video stream 410 is identical to that of the second coded video stream 420. The third request Q3, the fourth request Q4 and the fifth request Q5 are configured to ask the server 100 to provide the third coded video stream 430, the fourth coded video stream 440 and the fifth coded video stream 450 respectively. A resolution of the third coded video stream 430 is identical to those of the fourth coded video stream 440 and the fifth coded video stream 450 and different from that of the first coded video stream 410 and the second coded video stream 420. The sixth request Q6 is configured to ask the server 100 to provide the sixth coded video stream 460. A resolution of the sixth coded video stream 460 is different from those of the coded video streams 410 to 450.

Figure 2:
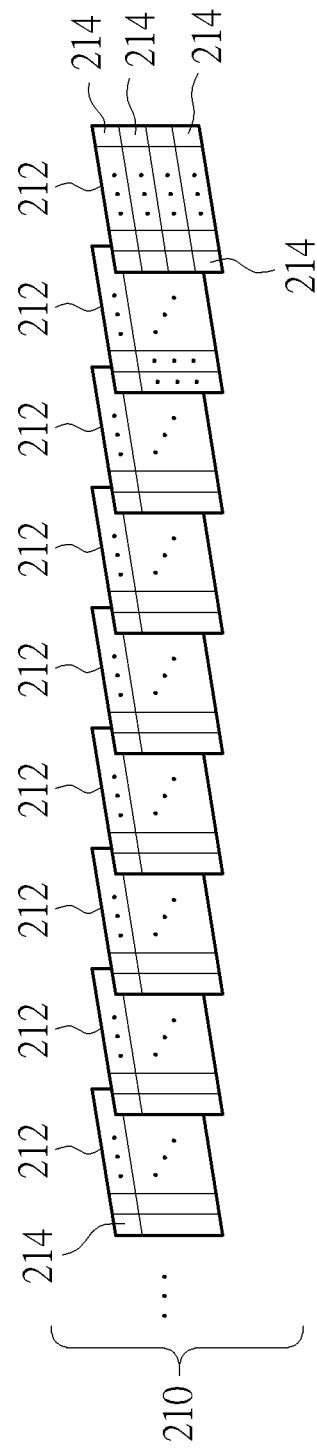
FIG. 2 is a schematic diagram of a first video stream shown in FIG. 1.
Figure 3:
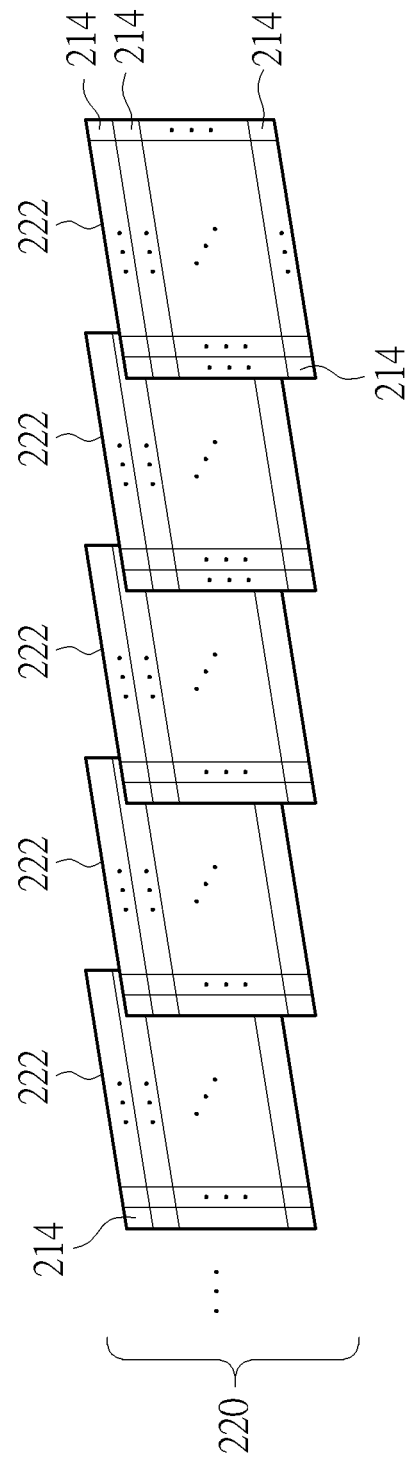
FIG. 3 is a schematic diagram of a second video stream shown in FIG. 1.
Figure 4:
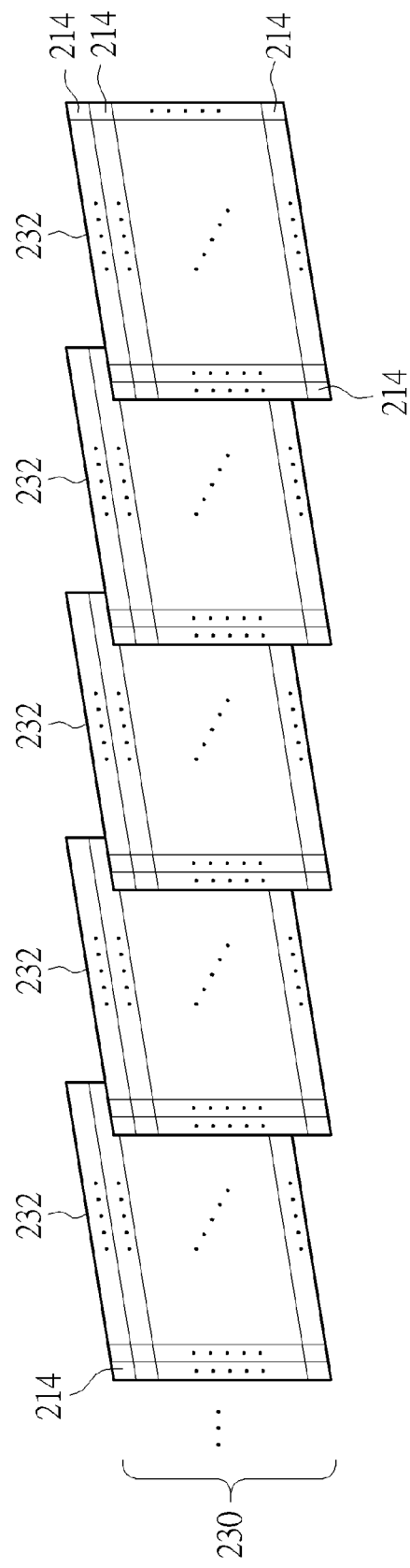
FIG. 4 is a schematic diagram of a third video stream shown in FIG. 1.

The requests Q1 to Q6 may have different configurations for encoding the original video stream 200, such that the original video stream 200 may be encoded with different resolutions, bitrates, profiles/levels, GOP (Group of Pictures) lengths, frame rates, etc. In order to reduce complexity of encoding the original video stream 200 into the coded video streams 410 to 460, the server 100 scales the original video stream 200 into diverse video streams having different resolutions according to the resolutions of the video streams requested by the client terminals 110 to 160. For example, the server 100 scales the original video stream 200 into a first video stream 210 in response to the first request Q1 and the second request Q2 since the resolutions of the first coded video stream 410 and the second coded video stream 420 are the same. Further, the server 100 scales the original video stream 200 into a second video stream 220 in response to the third, fourth and fifth requests Q3, Q4 and Q5 since the resolutions of the third, fourth and fifth coded video streams 430, 440 and 450 are the same. The server 100 further scales the original video stream 200 into a third video stream 230 in response to the sixth request Q6, and then encodes the third video stream 230 into the sixth coded video stream 460. That is, the server 100 encodes the first video stream 210 into the first and second coded video streams 410 and 420, encodes the second video stream 220 into the third, fourth and fifth coded video streams 430, 440 and 450, and encodes the third video stream 230 into the sixth coded video stream 460. As shown in FIGS. 2, 3 and 4, each the first, second and third video stream 210, 220 and 230 comprises a plurality of frames 212, 222 or 232, each of the frames 212, 222 and 232 comprises a plurality of macroblocks 214, and each of the macroblocks 214 typically comprises 16×16 pixels.

Please refer to FIG. 1. In order to encode the first video stream 210 into the first coded video stream 410 and the second coded video stream 420, the server 100 carries out a first prediction procedure P1, a first transform procedure T1, a second transform procedure T2, a first coding procedure C1 and a second coding procedure C2. In response to the first request Q1 and the second request Q2, the server 100 performs the first prediction procedure P1 to predict the macroblocks 214 of the frames 212 of the first video stream 210 to generate a first set of predictions 240. In addition, the server 100 performs the first transform procedure T1 to transform the first set of predictions 240 into a first set of quantized transform coefficients 310 in response to the first request Q1 and the second transform procedure T2 to transform the first set of predictions 240 into a second set of quantized transform coefficients 320 in response to the second request Q2. Subsequently, the server 100 performs the first coding procedure C1 to code the first set of quantized transform coefficients 310 into the first coded video stream 410 and the second coding procedure C2 to code the second set of quantized transform coefficients 320 into the second coded video stream 410. Since the server 100 performs the first prediction procedure P1 once to generate the first set of predictions 240 that are used to perform the first transform procedure T1 and the second transform procedure T2, the server 100 has reduced the workload for predicting the macroblocks 214 of the frames 212 of the first video stream 210, thereby enhancing the efficiency to encode the first video stream 210 into the first coded video stream 410 and the second coded video stream 420.

Similarly, in order to encode the second video stream 220 into the third coded video stream 430, the fourth coded video stream 440 and the fifth coded video stream 450, the server 100 carries out a second prediction procedure P2, a third transform procedure T3, a fourth transform procedure T4, a fifth transform procedure T5, a third coding procedure C3, a fourth coding procedure C4 and a fifth coding procedure C5. In response to the third request Q3, the fourth request Q4 and the fifth request Q5, the server 100 performs the second prediction procedure P2 to predict the macroblocks 214 of the frames 222 of the second video stream 220 to generate a second set of predictions 250. In addition, the server 100 performs the third transform procedure T3 to transform the second set of predictions 250 into a third set of quantized transform coefficients 330 in response to the third request Q3, the fourth transform procedure T4 to transform the second set of predictions 250 into a fourth set of quantized transform coefficients 340 in response to the fourth request Q4, and the fifth transform procedure T5 to transform the second set of predictions 250 into a fifth set of quantized transform coefficients 350 in response to the fifth request Q5. Subsequently, the server 100 performs the third coding procedure C3 to code the third set of quantized transform coefficients 330 into the third coded video stream 430, the fourth coding procedure C4 to code the fourth set of quantized transform coefficients 340 into the fourth coded video stream 440, and the fifth coding procedure C5 to code the fifth set of quantized transform coefficients 350 into the fifth coded video stream 450. Since the server 100 performs the second prediction procedure P2 once to generate the second set of predictions 250 that are used to perform the third, fourth and fifth transform procedures T3, T4 and T5, the server 100 has reduced the workload for predicting the macroblocks 214 of the frames 222 of the second video stream 220, thereby enhancing the efficiency to encode the second video stream 220 into the third, fourth and fifth coded video streams 430, 440 and 450.

In response to the sixth request Q6, the server 100 carries out a third prediction procedure P3, a sixth transform procedure T6 and sixth coding procedure C6 to produce the sixth coded video stream 460. By performing the third prediction procedure P3, the server 100 predicts the macroblocks 214 of the frames 232 of the third video stream 230 to generate a third set of predictions 260. In addition, the server 100 performs the sixth transform procedure T6 to transform the third set of predictions 250 into a sixth set of quantized transform coefficients 360. Subsequently, the server 100 performs the sixth coding procedure C6 to code the sixth set of quantized transform coefficients 360 into the sixth coded video stream 460.

In an embodiment of the present invention, each of the first prediction procedure P1 and the second prediction procedure P2 may comprise a plurality of prediction processes. During the prediction processes, the server 100 processes the frames 212 in units of a macroblock 214 and forms a prediction of the current macroblock based on previously-coded data, either from the current frame (intra prediction) or from other frames that have already been coded and transmitted (inter prediction). The server 100 accomplishes one of the prediction processes by subtracting the prediction from the current macroblock to form a residual macroblock. Further, finding a suitable inter prediction is often described as motion estimation, and subtracting an inter prediction from the current macroblock is motion compensation. An H.264/AVC encoder of the server 100 can select from many different options or modes when it predicts a macroblock. The prediction modes include a skip mode, four intra-16×16 modes, nine intra-4×4 modes, a 16×16 inter mode, an 8×16 inter mode and an 8×8 inter mode. The first and second transform procedures T1 and T2 use the motion estimations and selected prediction mode of the first prediction procedure P1 to generate the first and second sets of quantized transform coefficients 310 and 320. Similarly, the third, fourth and fifth transform procedures T3, T4 and T5 use the motion estimations and selected prediction mode of the second prediction procedure P2 to generate the third, fourth and fifth sets of quantized transform coefficients 330, 340 and 350.

In an embodiment of the present invention, when each of the transform procedures T1 to T6 is performed, a block of residual samples is transformed using a 4×4 or 8×8 integer transform, an approximate form of the Discrete Cosine Transform (DCT). The transform outputs a set of coefficients, each of which is a weighting value for a standard basis pattern. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. Setting QP to a low value means that more non-zero coefficients remain after quantization, resulting in better decoded image quality but lower compression.

In an embodiment of the present invention, when each of the coding procedures C1 to C6 is performed, the server 100 produces a number of values that must be encoded to form a corresponding coded stream 410 to 460. These values may include quantized transform coefficients, information to enable one of the client terminals 110 to 160 to re-create the prediction, information about the structure of the compressed data and the compression tools used during encoding, and information about the complete video sequence.

Generally, the resolutions of the first coded video stream 410 and the second coded video stream 420 are identical to the resolution of the first video stream 210, the resolutions of the third coded video stream 430, the fourth coded video stream 440 and the fifth coded video stream 450 are identical to the resolution of the second video stream 220, and the resolution of the sixth coded video stream 460 is identical to the resolution of the third video stream 230. In an embodiment of the present invention, the resolution of the third video stream 230 is greater than those of the first video stream 210 and the second video stream 220, the resolution of the second video stream 220 is greater than that of the first video stream 210, and the first set of predictions 240 comprises motion vectors 242. The server 100 performs the second prediction procedure P2 after the first prediction procedure P1. When the second prediction procedure P2 is performed, the server 100 uses the motion vectors 242 as initial search points to predict the macroblocks 214 of the frames 222 of the second video stream 220 to generate the second set of predictions 250. Since the motion vectors 242 are used to perform the second prediction procedure P2, the server 100 may generate the second set of predictions 250 more efficiently. Similarly, in the embodiment, the third prediction procedure P3 may be performed after the second prediction procedure P2, and the second set of predictions 250 may comprise motion vectors 252. When the server 100 performs the third prediction procedure P3, the server 100 uses the motion vectors 252 as initial search points to predict the macroblocks 214 of the frames 232 of the third video stream 230 to generate the third set of predictions 260. Since the motion vectors 252 are used to perform the third prediction procedure P3, the server 100 may generate the third set of predictions 260 more efficiently.

In summary, the present invention provides a method for transcoding multiple versions of a source video from a server to a plurality of client terminals at different operational points, e.g. different resolutions, bitrates, or frame rates. In response to the requests received from the client terminals, the source video is decoded into an original video stream, and the original video stream is scaled into diverse video streams with different resolutions according to resolutions of video streams requested by client terminals. Moreover, since multiple transform procedures may use motion estimations and selected prediction mode of a single prediction procedure to generate multiple sets of quantized transform coefficients, the server has a high efficiency for encoding the original video stream.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transcoding video streams by a server, comprising:

receiving a first request from a first client terminal;
receiving a second request from a second client terminal;
predicting macroblocks of frames of a first video stream to generate a first set of predictions in response to the first request and the second request;
transforming the first set of predictions into a first set of quantized transform coefficients in response to the first request;
transforming the first set of predictions into a second set of quantized transform coefficients in response to the second request;
coding the first set of quantized transform coefficients into a first coded video stream;
coding the second set of quantized transform coefficients into a second coded video stream having a resolution identical to a resolution of the first coded video stream;
transmitting the first coded video stream from the server to the first client terminal, and transmitting the second coded video stream from the server to the second client terminal;
receiving a third request from a third client terminal;
predicting macroblocks of frames of a second video stream to generate a second set of predictions in response to the third request, wherein the second video stream has a resolution different from a resolution of the first video stream;
transforming the second set of predictions into a third set of quantized transform coefficients;
coding the third set of quantized transform coefficients into a third coded video stream; and
transmitting the third coded video stream from the server to the third client terminal.

2. The method of claim 1 further comprising:
decoding a source video into an original video stream; and
scaling the original video stream into the first video stream.

3. The method of claim 1 further comprising:
decoding a source video into an original video stream; and
scaling the original video stream into the first video stream and the second video stream.

4. The method of claim 1, wherein the first set of predictions comprises motion vectors, and predicting macroblocks of frames of the second video stream to generate the second set of predictions in response to the third request comprises:
using the motion vectors to predict the macroblocks of the frames of the second video stream to generate the second set of predictions.

5. The method of claim 4, wherein the resolution of the second video stream is greater than the resolution of the first video stream.

6. The method of claim 1 further comprising:
receiving a fourth request from a fourth client terminal;
transforming the second set of predictions into a fourth set of quantized transform coefficients in response to the fourth request;
coding the fourth set of quantized transform coefficients into a fourth coded video stream having a resolution identical to a resolution of the third coded video stream; and
transmitting the fourth coded video stream from the server to the fourth client terminal.

* * * * *